(12) United States Patent
Agarwal

(10) Patent No.: US 11,422,734 B2
(45) Date of Patent: Aug. 23, 2022

(54) MANAGING OVERWRITE DATA WITHIN SOLID STATE DRIVES

(71) Applicant: Western Digital Technologies, Inc., San Jose, CA (US)

(72) Inventor: Dinesh Kumar Agarwal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/187,275

(22) Filed: Feb. 26, 2021

(65) Prior Publication Data

US 2022/0214824 A1    Jul. 7, 2022

Related U.S. Application Data

(60) Provisional application No. 63/134,430, filed on Jan. 6, 2021.

(51) Int. Cl.
G06F 3/06 (2006.01)

(52) U.S. Cl.
CPC .......... *G06F 3/0652* (2013.01); *G06F 3/0665* (2013.01); *G06F 3/0683* (2013.01); *G06F 3/0604* (2013.01)

(58) Field of Classification Search
CPC .... G06F 3/0652; G06F 3/0665; G06F 3/0683; G06F 3/0604
See application file for complete search history.

(56) References Cited

U.S. PATENT DOCUMENTS

| 7,752,180 B1 * | 7/2010 | Fair ..................... G06F 11/1464 |
| | | 707/690 |
| 9,836,369 B2 | 12/2017 | Macko et al. |
| 9,841,906 B2 | 12/2017 | Sokolov et al. |
| 2016/0239380 A1 * | 8/2016 | Wideman .......... H03M 13/3761 |
| 2017/0075583 A1 * | 3/2017 | Alexander ......... G11B 20/1217 |
| 2017/0124104 A1 * | 5/2017 | Smith .................. G06F 16/148 |
| 2020/0167274 A1 * | 5/2020 | Bahirat .................. G06F 3/064 |

(Continued)

OTHER PUBLICATIONS

"Device Mapper" Zoned Storage Initiative, screen capture Aug. 22, 2020, https://zonedstorage.io/linux/dm/.

(Continued)

*Primary Examiner* — Eric Cardwell
(74) *Attorney, Agent, or Firm* — Ravi Mohan; Rutan & Tucker, LLP

(57) ABSTRACT

Storage devices can be configured to desirably reduce the number of times a zone reset or erasure occur via the use of one or more paired overwrite memory blocks. These storage devices can include a plurality of memory devices with some of these memory devices designated as overwrite memory devices. A controller within the storage device can be configured to direct the storage device to generate one or more subsets within the memory devices such as zones, pair each of subsets with at least one or more overwrite memory devices, store data sequentially within the subset of memory devices, and store any received overwrite data in the overwrite memory devices in chronological order. Data stored within the subsets of memory devices are not erased and instead of being overwritten directly, are instead pointed via a control table to a location in the overwrite memory devices storing the corresponding overwrite data.

16 Claims, 8 Drawing Sheets

(56) References Cited

U.S. PATENT DOCUMENTS

| | | | | |
|---|---|---|---|---|
| 2020/0349121 A1* | 11/2020 | Lee | ....................... | G06F 3/0661 |
| 2021/0182166 A1* | 6/2021 | Hahn | ..................... | G06F 3/0688 |
| 2021/0223962 A1* | 7/2021 | Esaka | ..................... | G06F 3/061 |
| 2021/0382643 A1* | 12/2021 | Muthiah | ............... | G06F 3/0644 |
| 2021/0389879 A1* | 12/2021 | Inbar | ..................... | G06F 3/0656 |

OTHER PUBLICATIONS

Macko, P. et al., "SMORE: A Cold Data Object Store for SMR Drives", In Porceeding, 34th Symposium, Mass Storage System Technology (MSST), 2017.

Xie, X. et al., "ZoneTier: A Zone-based Storage Tiering and Caching Co-design to Integrate SSDs with SMR Drives", ACM Transactions on Storage (TOS), Jul. 2019, vol. 15, No. 3, pp. 1-25.

* cited by examiner

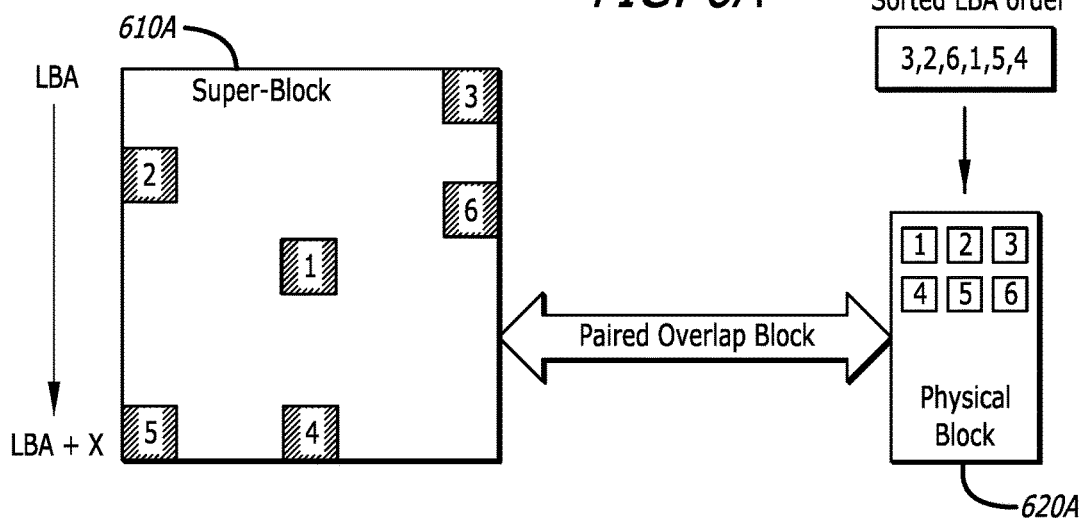
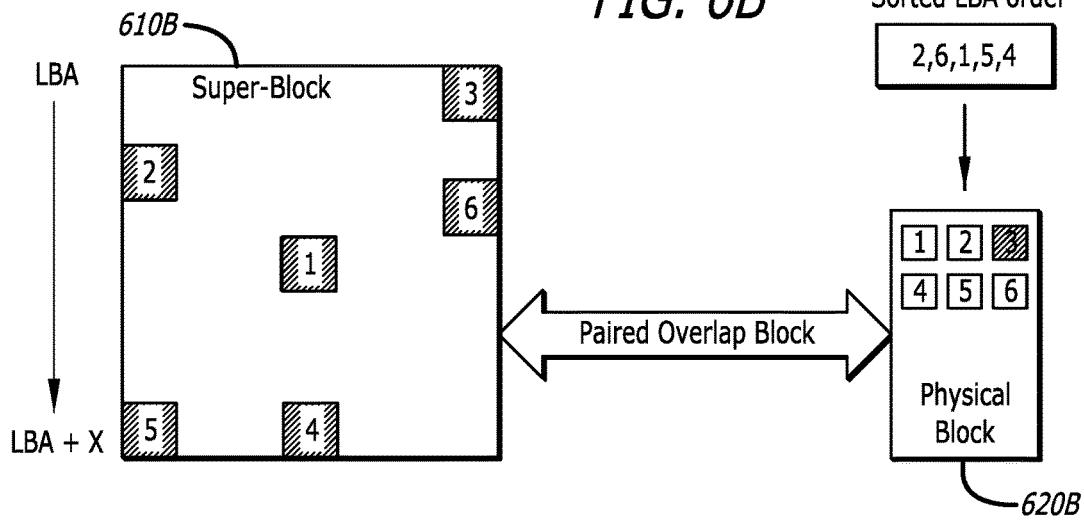
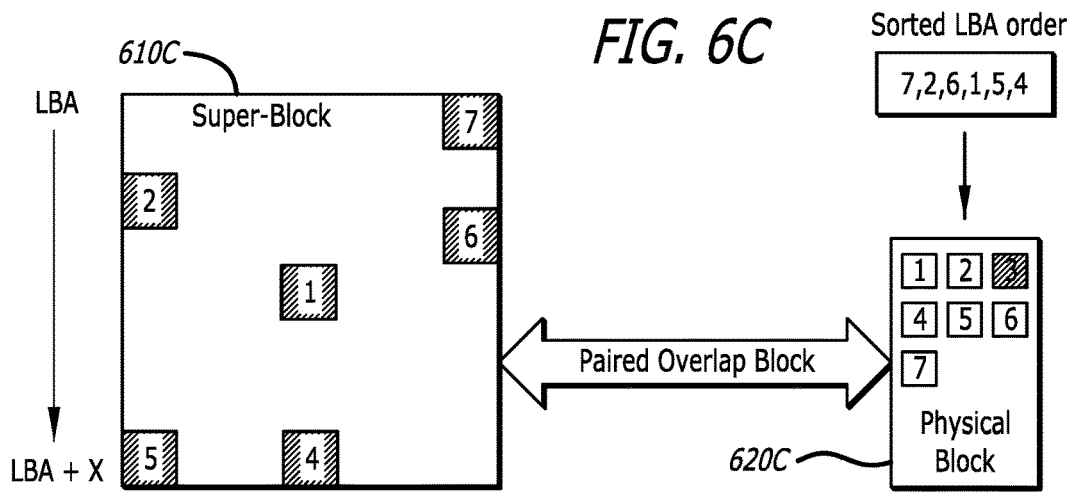

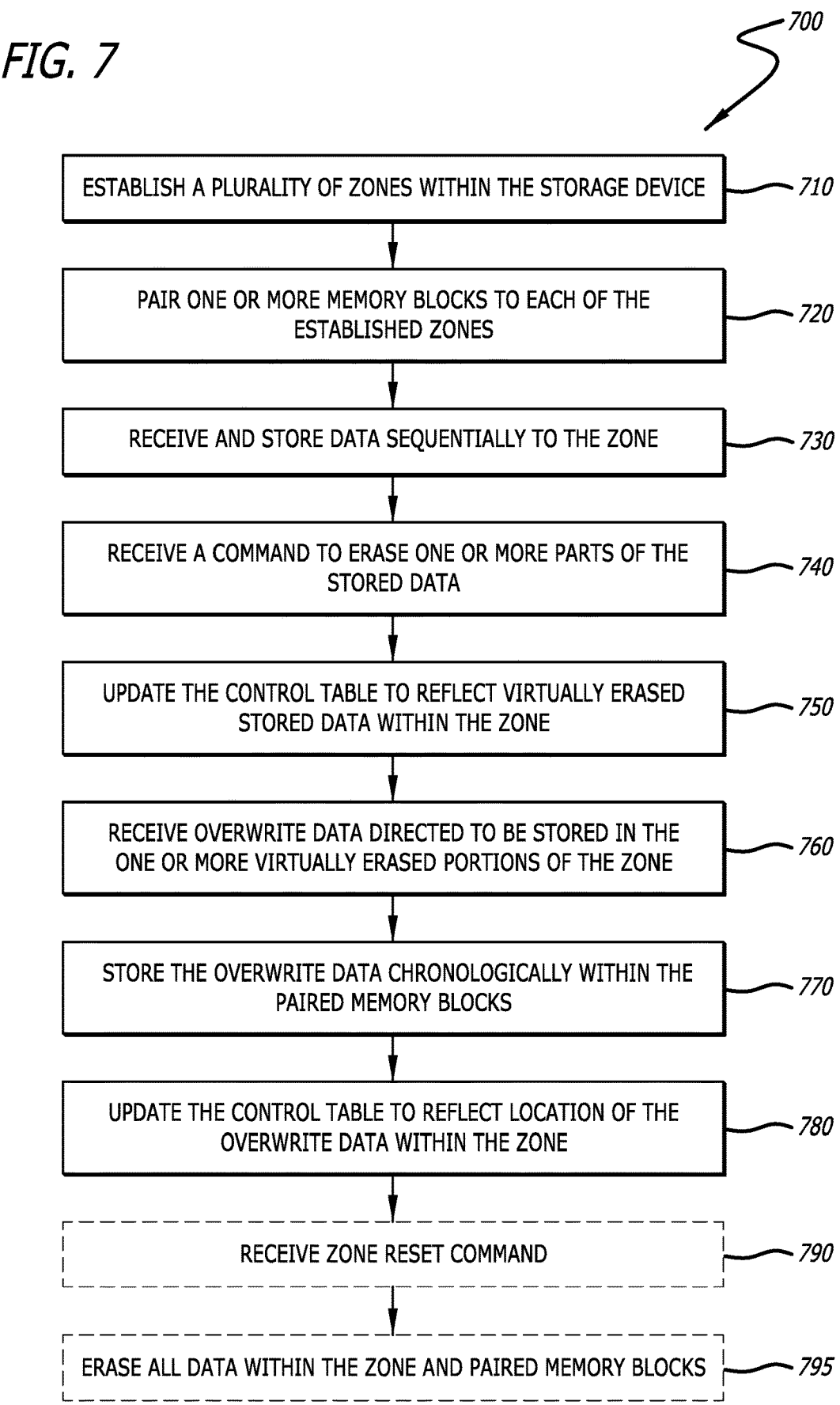

MANAGING OVERWRITE DATA WITHIN SOLID STATE DRIVES

PRIORITY

This application claims the benefit of priority to U.S. Provisional Application No. 63/134,430, filed Jan. 6, 2021, which is incorporated in its entirety herein.

FIELD

This disclosure relates to data management on solid state drives. More particularly, the present disclosure technically relates to managing overwrite data within one or more specialized overwrite memory devices.

BACKGROUND

Solid state drives (SSDs) have become more ubiquitous within computing systems at both the consumer and enterprise level. One of the known limitations of SSDs is that each memory device that stores data has a limited amount of erase and write cycles available before the memory device becomes unusable. Likewise, SSDs also typically require erasure of entire blocks of memory devices, even when only one memory device requires erasure.

One feature within SSDs that has seen increasing usage is that of zoned namespaces (ZNS). SSDs that implement ZNS utilize the Zoned Namespace Command Set as defined by the Non-Volatile Memory Express™ (NVMe™) organization. The specification provides a zoned storage device interface that allows the SSD and a host computing device to collaborate on data placement, such that data can be aligned to the physical media of the SSD, improving the overall performance and increasing the capacity that can be exposed to the host computing device.

SSDs partitioned into zones via ZNS can be susceptible to increased wear when a zone is full and has subsequent overwrite data written. The overwritten data can be broken up and stored non-sequentially within the remaining available spaces within the previously written zone. As the zone becomes more fragmented with various original data and overwrites, increased wear can occur to the memory devices within the zone of the SSD.

BRIEF DESCRIPTION OF DRAWINGS

The foregoing summary is illustrative and is not intended to be in any way limiting. In addition to the illustrative aspects, embodiments, and features described above, further aspects, embodiments, and features will become apparent by reference to the following drawings and the detailed description.

FIG. 6A is a conceptual illustration of overwrite data management between a superblock and paired physical block in accordance with an embodiment of the invention;

FIG. 6B is a conceptual illustration of deleting overwrite data within a paired overwrite block in accordance with an embodiment of the invention;

FIG. 6C is a conceptual illustration of storing and updating the paired overwrite block with new overwrite data in accordance with an embodiment of the invention;

FIG. 7 is a flowchart depicting a process for managing overwrite data within a zone of a storage device in accordance with an embodiment of the invention.

Figure 1:
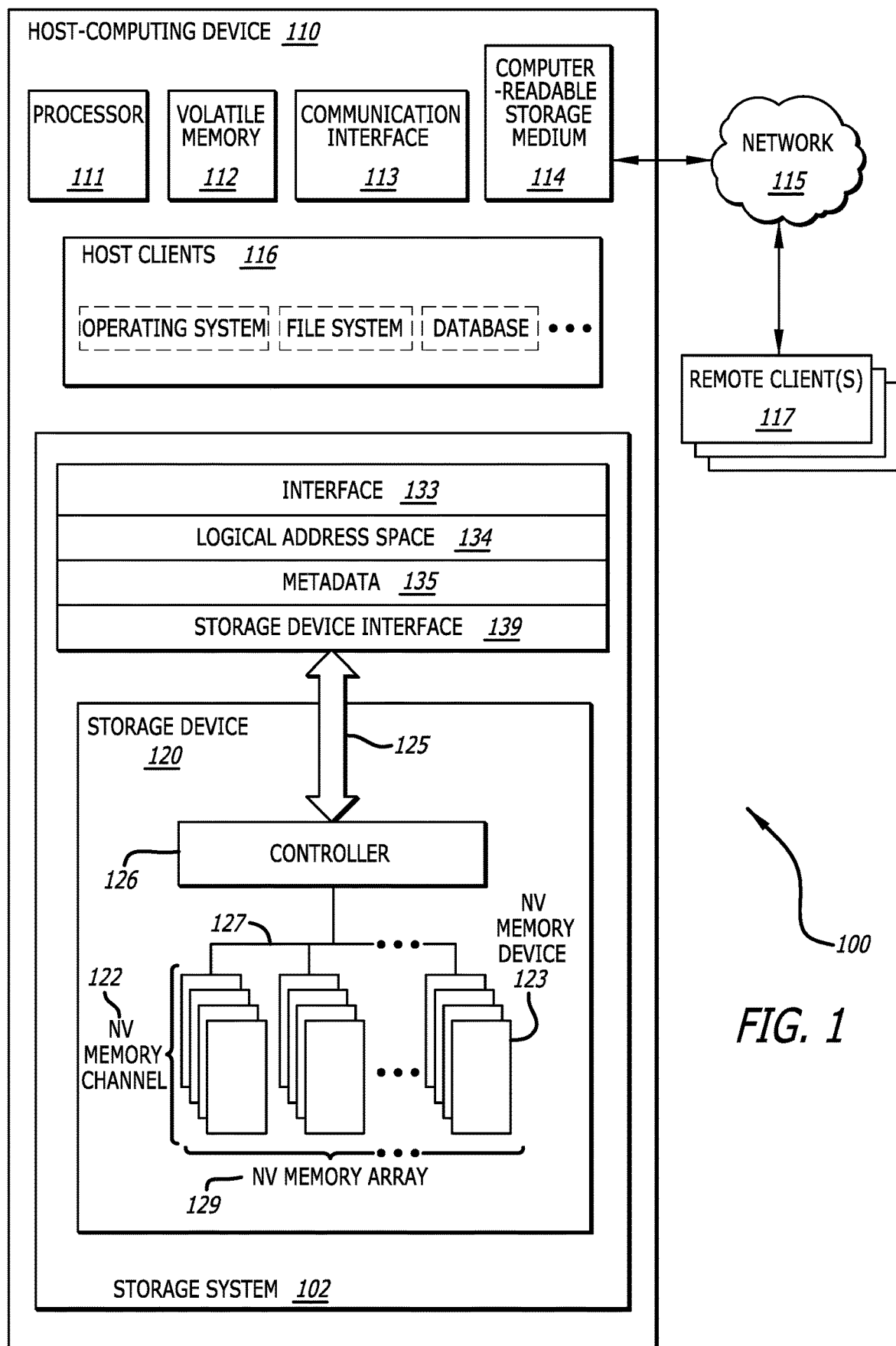
FIG. 1 is a schematic block diagram of a host-computing device with a storage device suitable for overwrite data management in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are discussed herein that describe systems, methods and processes for managing overwrite data by utilizing one or more paired memory blocks that are utilized solely for storing overwrite data. In many instances it has been determined that once a storage device is partitioned into various zones, subsequent overwrite data can be issued that can be less than two percent of the overall size of the zone. Any data that changes preexisting data or data that is selected to be located within a previously erased location within the storage device can be considered overwrite data.

Various embodiments, instead of erasing portions of the zone and inserting this overwrite data into the fragmented erased portions of the zone, store the overwrite data within one or more paired memory devices and store a pointer to the data in a control table that would otherwise point to the logical block address (LBA) of the original location of the data within the zone. In this way, fewer erase commands can be sent to the zone, resulting in fewer zone resets. This can increase the overall memory device lifespan within the zone.

In further embodiments, data stored in the overwrite memory blocks may also be overwritten. In these instances, the data within the overwrite memory devices are treated similarly to the memory devices within the zone. The overwrite memory set for erasure is not changed, new data is stored in chronologically received order within the paired memory block, and the control table is updated to point not to the zone, or to the original location within the paired memory block, but to the updated location within the paired memory block. This process can repeat until the paired memory block is full, or a zone reset command is received. In both cases, the zone and paired memory block is fully erased and ready for rewriting with only a single erase occurring during the entire cycle. The original data can be moved and sequentially written to a new zone with an empty overwrite memory block paired with it.

In some embodiments, the ratio of general memory blocks to memory blocks selected for storing overwrite data can be ninety-six to one. Generally, to reduce the overall cost, the blocks set aside for overwrite management do not exceed one to two percent of the overall general memory blocks available. The paired overwrite memory blocks can be selected from the overprovisioned memory blocks. In this way, this method may be achieved on pre-existing storage devices already out in the field via a firmware update and does not directly require changes to any hardware layout of the storage device, thus saving money and manufacturing costs.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for managing overwrite data in accordance with an embodiment of the invention is shown. The improved overwrite data management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise a computer-readable storage medium 114. The computer-readable storage medium 114 may comprise executable instructions configured to cause the host-computing device 110 (e.g., via processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117. The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile storage medium, or the like. Further, the storage device 120, in various embodiments, may comprise a non-volatile recording device, a non-volatile memory array, a plurality of interconnected storage devices in an array, or similar.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
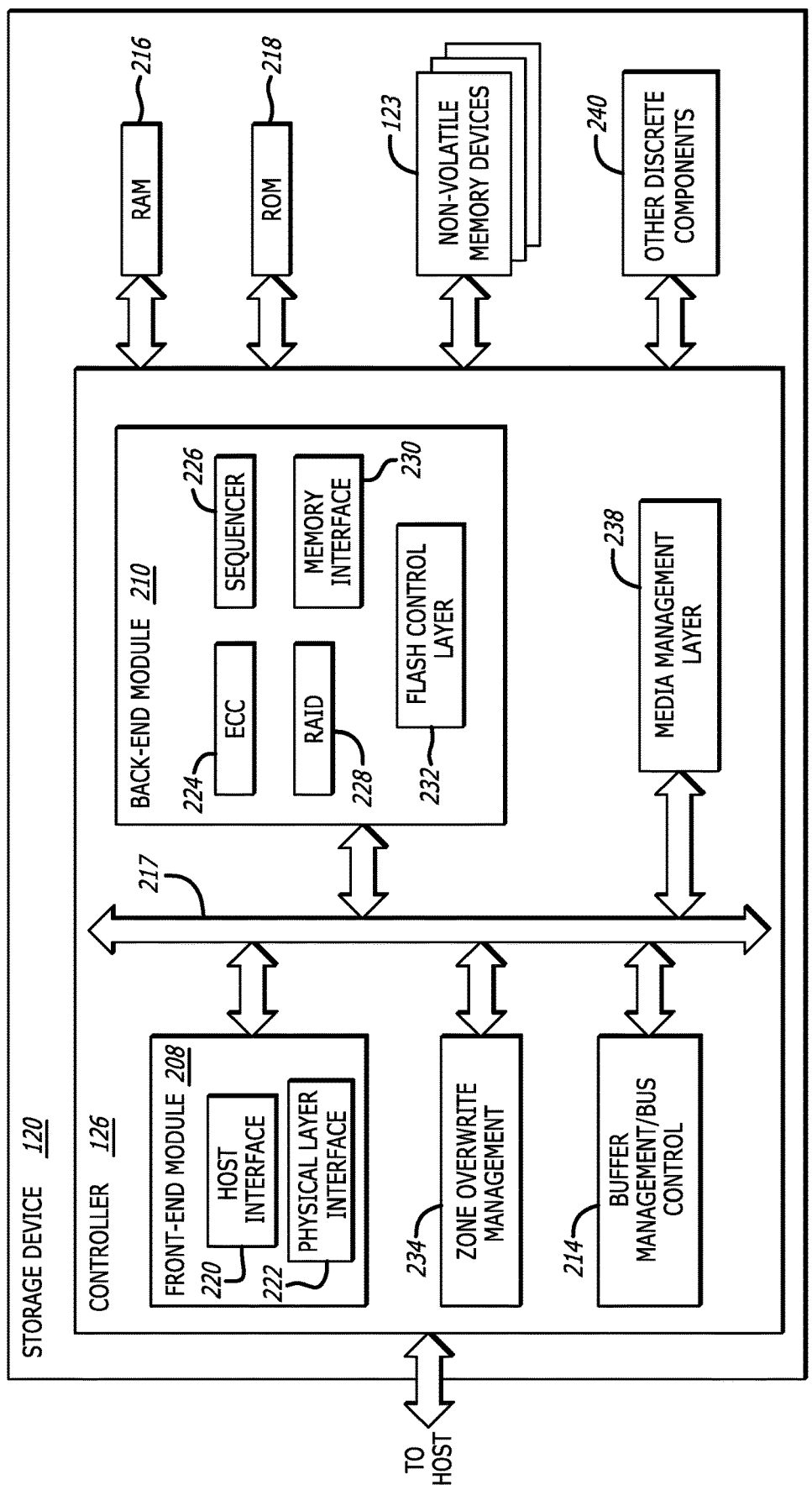
FIG. 2 is a schematic block diagram of a storage device suitable for overwrite data management in accordance with an embodiment of the invention.

FIG. 2 depicts a block diagram illustrating exemplary components of the storage device 120 in more detail. The controller 126 may include a front-end module 208 that interfaces with a host, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a zone overwrite management logic 234 that can be configured to facilitate the process of managing one or more overwrite memory blocks. The zone overwrite management logic 234 can direct erase commands to instead virtually erase various memory blocks within the zone via a change in the control table which marks the location of all data within the storage device. The zone overwrite management logic 234 can also direct newly received overwrite data to be stored chronologically within a particular memory block which is paired to the original zone.

As described in more detail below, the zone overwrite management logic 234 can be operated as a separate logic but may often be comprised within the firmware operated by the controller. In certain embodiments, the zone overwrite management logic 234 can be operated at a direct memory device level which can occur without the intervention of either the firmware or the host-computing device. In various additional embodiments, the zone overwrite management logic 234 can communicate to the host computing device to indicate what options are available regarding the overwrite data management process and receive requests from the host-computing device if any options are desired. Finally, further embodiments may have the zone overwrite management logic 234 operating one or more artificial intelligence or other heuristic algorithm that can monitor the usage of the storage device and turn on and off the overwrite data management features per zone or device-wide.

Figure 3:
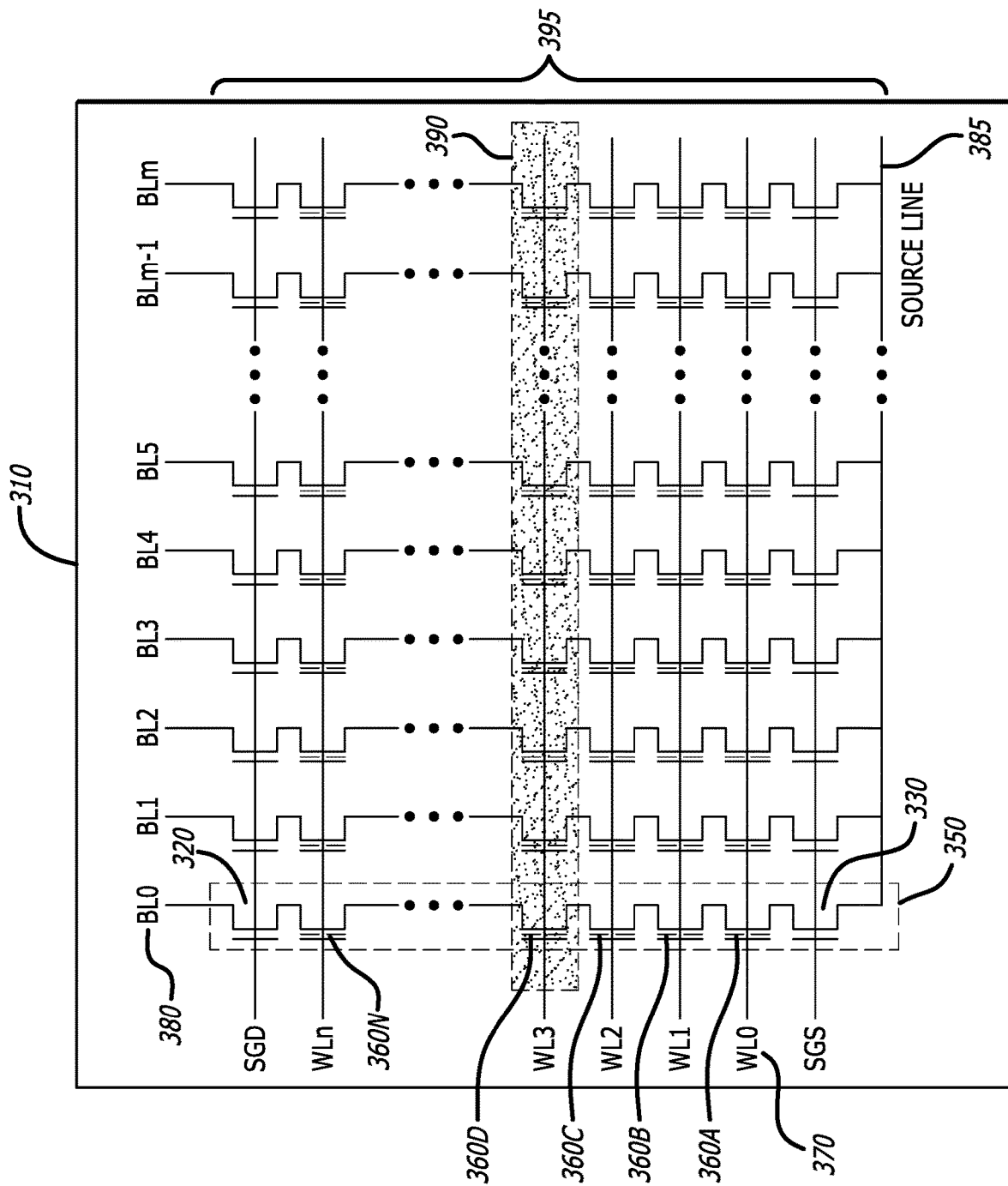
FIG. 3 is a conceptual schematic diagram of a two-dimensional memory array in accordance with an embodiment of the invention.

Referring to FIG. 3, a conceptual schematic diagram of a two-dimensional memory array 310 in accordance with an embodiment of the invention is shown. Memory cells, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations.

Figure 4:
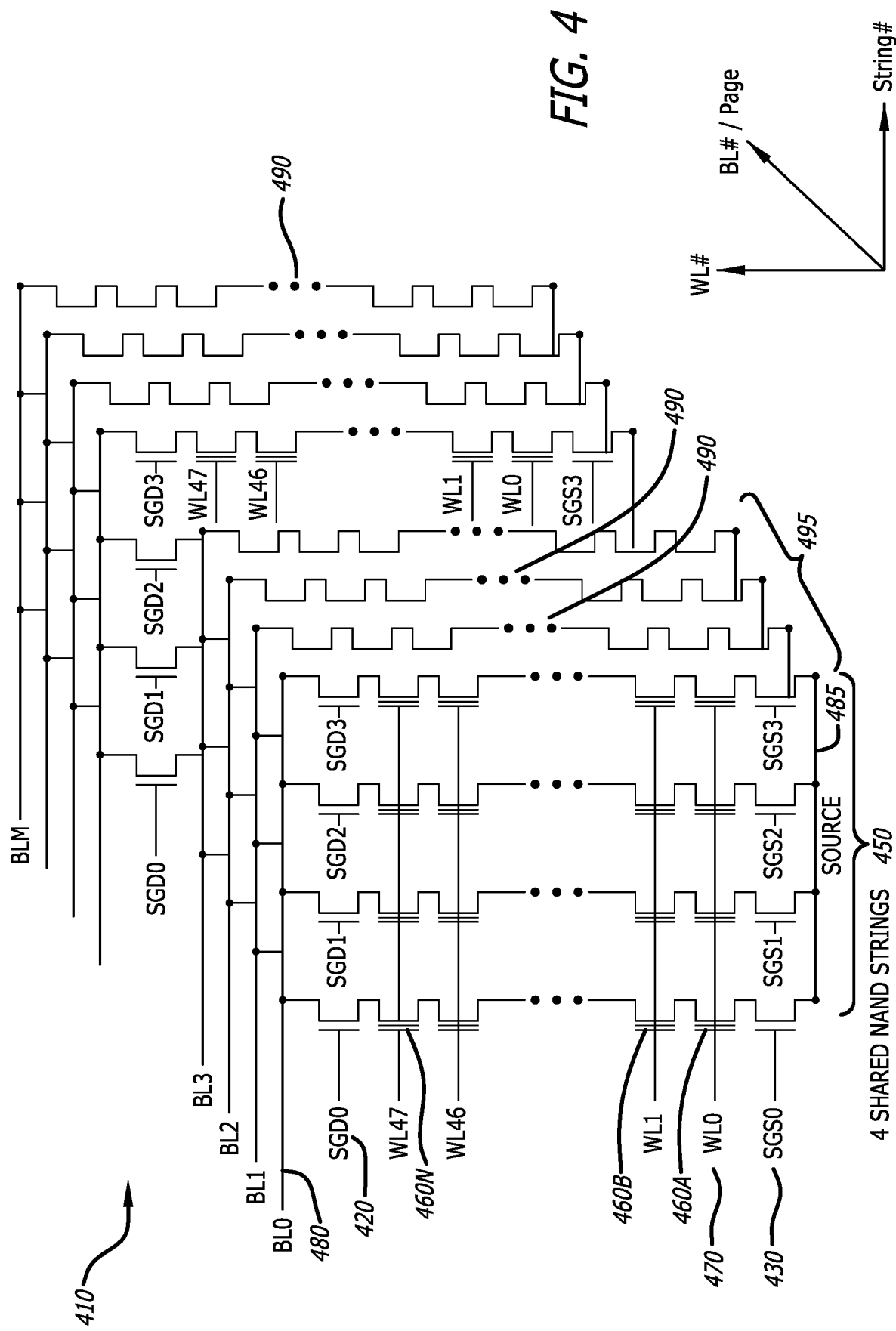
FIG. 4 is a conceptual schematic diagram of a three-dimensional memory array in accordance with an embodiment of the invention.

Referring to FIG. 4, a conceptual schematic diagram of a three-dimensional memory array 410 in accordance with an embodiment of the invention is shown. More specifically, FIG. 4 is a schematic diagram of one example of a three-dimensional memory array 410, such as a 3D or vertical NAND memory array or a BiCS2 cell array. In many embodiments, a three-dimensional memory array 410 can made up of a plurality of pages 490. Each page 490 may include a set of NAND strings 450 (four NAND strings are shown). Each set of NAND strings 450 is typically connected in common to a bit line 480. Each NAND string 450 may also include a select gate drain transistor (SGD) 420, a plurality of memory cells 460A, 460B, 460N, and a select gate source transistor (SGS) 430. A row of memory cells is connected in common to a word line 470.

The memory cells 360, 460 shown in the embodiments depicted in FIGS. 3 and 4 are typically made of a transistor that has a charge storage element to store a given amount of charge representing a memory state. The memory cells may be operated in a single-level cell (SLC) storing 1 bit of memory per cell, a MLC or X2 cell storing 2 bits of memory per cell, a tri-level cell (TLC) storing 3 bits of memory per cell, a quad-level cell (QLC) storing 4 bits of memory per cell, or any types of memory cell storing any number of bits per cell. The SGDs 320, 420 and SGSs 330, 430 are depicted as transistors where the voltage levels are also programmed to a certain threshold voltage level. SGDs 320, 420 connect or isolate the drain terminals of the NAND strings 350, 450 to the bit lines 380, 480. SGSs 330, 430 can connect or isolate the source terminals of the NAND strings 350, 450 to source lines 385, 485. The SGDs and SGSs can be configured to condition the word lines 370, 470 for read, program, and erase operations.

To read the data correctly from memory cells 360, 460 in a NAND configuration, the following requirements must be all met: (1) threshold voltage distributions in word lines are in proper states; (2) threshold voltage distributions in SGDs are in proper levels; and (3) threshold voltage distributions in SGSs are in proper levels. Without any one of these requirements, the data is unreadable. Page 390, 490 of FIG. 3 and FIG. 4 respectively, is a group of memory cells that are programmed as a group. Multiple pages 390, 490 can make up a block 395, 495. The memory cells in an individual block 395, 495 are typically erased together. A page is often the smallest write unit, and a block is often the smallest erasure unit.

This disclosure is not limited to the two dimensional and three-dimensional memory arrays as described in FIG. 3 and FIG. 4 but can cover all relevant memory structures as understood by one skilled in the art. Other three-dimensional arrays are possible, such as a NAND string formed in a U-shape. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of an SSD.

Figure 5:
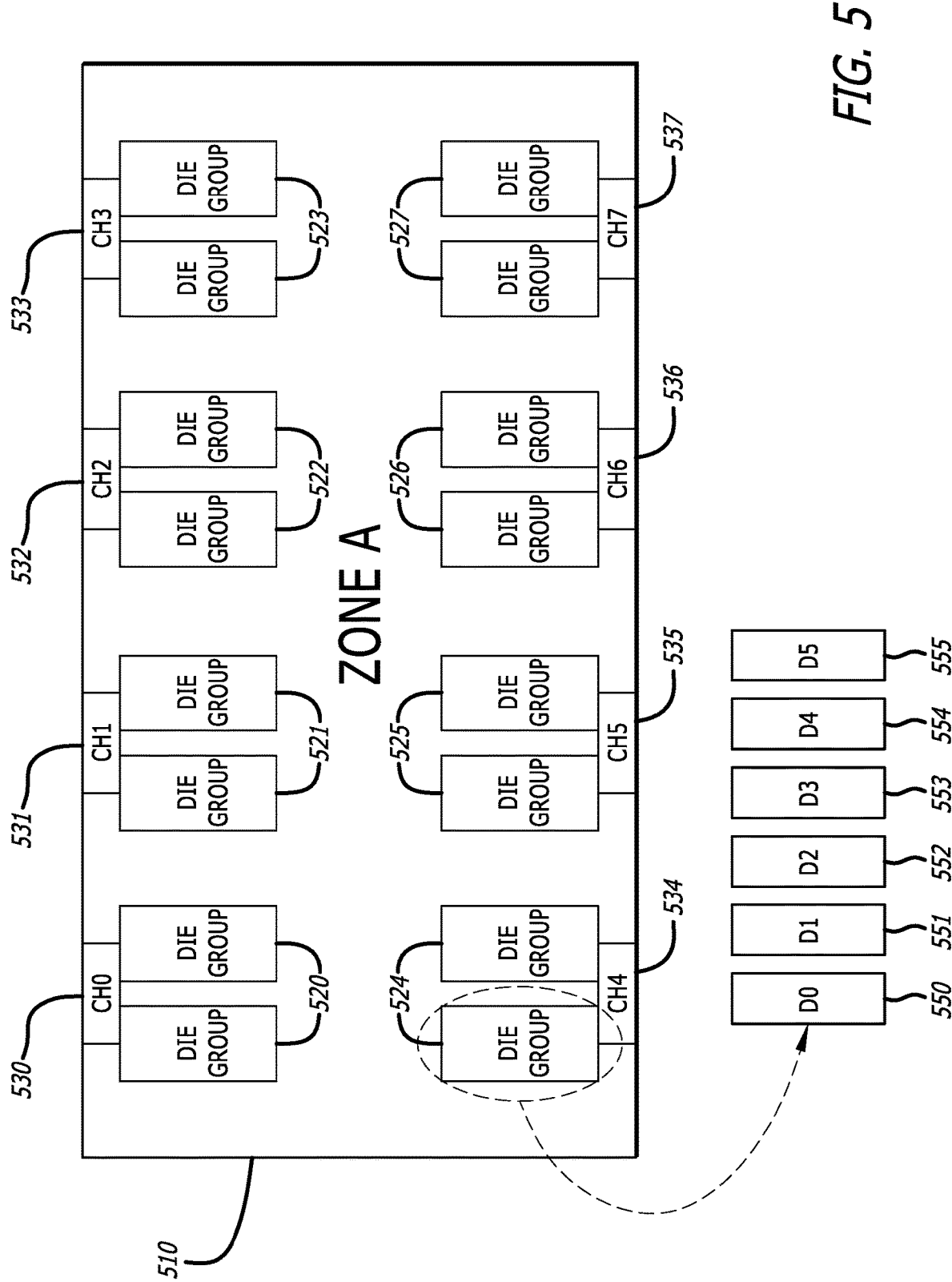
FIG. 5 is a conceptual schematic diagram of a superblock in accordance with an embodiment of the invention.

Referring to FIG. 5, a conceptual schematic diagram of a superblock in accordance with an embodiment of the invention is shown. In many embodiments, a storage device may partition one or more zones into superblocks 510 (i.e., each superblock 510 is partitioned as a zone). As conceptually shown in the embodiment depicted in FIG. 5, a superblock 510 may have eight channels 530-537 of input and output and each channel is in communication with two die groups within a die group pair 520-527 per channel. Each die group pair 520-527 can be comprised of a plurality of individual dies 550-555, as shown in die group 524 associated with channel four 534. In various embodiments each die group pair 520-527 can comprise six dies per die group.

In various embodiments, each superblock 510 within the storage device may be paired with a separate block of memory devices. The paired block may be from the over-provisioned blocks of memory devices. In further embodiments, the superblock 510 itself may set aside one block within the superblock 510 for overwrite management purposes. In many instances, in order to reduce costs, the amount of overwrite memory devices is configured to not exceed one to two percent of the overall general memory devices. Although the embodiments depicted in FIG. 5 shows a superblock 510 as the base size of overwrite memory management, it is contemplated that other sizes of memory devices may be partitioned and managed in this way. In many embodiments, the relationship between the number of memory devices and number of associated overwrite memory devices remains relatively constant. This relationship between general memory devices and the paired overwrite memory devices is shown below.

Referring to FIGS. 6A-6C, a process for handling updated overwrite data within the overwrite management system is shown. Specifically, this process outlines how overwrite data is managed and what steps are taken when the overwrite data itself is overwritten. FIG. 6A shows a conceptual illustration of overwrite data management between a superblock and paired physical block in accordance with an embodiment of the invention. A superblock 610A is paired with a separate physical block 620A which is configured to act as an overwrite block comprising a plurality of overwrite memory devices. Prior to the state shown in FIG. 6A, the superblock 510 has been fully written to in adjacent (logical block address (LBA)) order. Additionally, six pieces of the superblock 610 were issued an erase command and now contain invalid data (1-6).

Traditional methods of data management may actually erase the data within the affected memory devices of the superblock 610A. However, in various embodiments disclosed herein, the data is not actually erased but virtually erased, meaning that the firmware within the controller of the storage device has internally (typically within a control table) marked the memory devices for erasure as invalid, but has not changed the data stored within them. Various traditional methods may have then set these erased memory devices up for change by writing subsequent overwrite data directly to the erased or virtually erased memory devices. However, this process may cause further fragmentation and lead to decreased performance and potentially lead to a premature need to reset the zone or superblock 610A, leading to a lower effective lifespan.

In a variety of embodiments, the overwrite data will instead be written to the paired physical block 620A. The overwrite data can be written to the paired physical block 620A in chronological order, meaning that the data is written as it is received. The chronological order can often be different that the sequential or LBA order available on the superblock 610A. In these cases, the control table can be updated to store "deltas" or pointers from where the data would be in a sorted LBA order to the chronological order on the paired physical block 620A. In this way, the fragmentation of the available spaces on the superblock 610A may be overcome by having the data chronologically available on the paired physical block 620A. This can, in some instances, lead to increase read times as the data is adjacent and not fragmented across the superblock 610A.

Referring to FIG. 6B, a conceptual illustration of deleting overwrite data within a paired overwrite block in accordance with an embodiment of the invention is shown. Once the storage device has been arranged to the state depicted in FIG. 6A, a command from the host processor may be subsequently received to erase all or some of the overwrite data. In the embodiment depicted in FIG. 6B, the host has sent a command to erase the "3" portion of the overwrite data. In response to this type of received command, the firmware operating on the controller can direct a change in the control table to indicate that the "3" data within the paired physical block 620B is now invalid. The result is that in the LBA order, there is now a space where the "3" data sits within the superblock 610B. Similar to the superblock data, no change is made to the actual memory devices within the paired physical block 620B. Similarly, no change is made to the memory devices within the superblock 610B. Indeed, the "3" data within the superblock 610B would still contain the same data originally written to the superblock prior to overwriting.

Referring to FIG. 6C, a conceptual illustration of storing and updating the paired overwrite block with new overwrite data in accordance with an embodiment of the invention is shown. Once the process depicted in FIG. 6B has been completed, the superblock 610B is capable of receiving another piece of overwrite data. As shown in FIG. 6C, the host has sent new overwrite data to store (data "7"). The storage device can direct that new overwrite data to the paired physical block 620C which then stores the new data chronologically after the previously received data. Again, in traditional embodiments, the new overwrite data may have been put in place of the original overwrite data (data "3"). However, in most embodiments, the paired physical block is configured to only store data in chronologically received order.

The new overwrite data is marked within the control table as being available within the LBA order in the spot that the previous overwrite data was in within the superblock 610C. This process can repeat over again as needed. Limits to this process typically are retrained by the available size of the overwrite blocks or the commands received from the host computing device.

Referring to FIG. 7, a flowchart depicting a process for managing overwrite data within one or more zones of a storage device in accordance with an embodiment of the invention is shown. In many embodiments, the demarcation of the pairing between general memory devices and overwrite memory devices is done through zones. The storage device can be partitioned into a number of zones, each zone utilized by one or more host computing devices (block 710). The size of the zones may vary, but are often done in uniform sizes relative to a physical number of memory devices. During this zone creation, one or more memory blocks are paired to the established zones (block 720). The paired memory blocks can be configured to act as overwrite memory blocks as discussed above. The pairing may be done via software by utilizing preexisting memory devices such as overprovisioned memory devices. In other embodiments, the memory devices themselves may be within a structure that is hardwired to have a paired overwrite memory block and handle the overwrite management process without the need for firmware or other software intervention.

The established zone can then receive and store data sequentially to the zone (block 730). In a number of embodiments, the zone will be filled with data that is written sequentially such that it can read it sequentially, which typically offers some performance enhancement. However, during the course of use, various parts of the data stored within the zone may become invalid or need to be changed. The host computing device will send a command to erase those portions of the data stored data (block 740). Instead of directly erasing or otherwise changing the data stored within the zone, the process 700 will update the control table operated by the firmware within the controller to reflect that the stored data is now virtually erased within the zone (block 750). In this way, the storage device will report to the host computing device that the now virtually erased storage space is available without directly changing the memory devices.

During a subsequent period, the host computing device will have new data to write to the virtually erased area of the zone. The storage device can receive this overwrite data that would be directed to be stored in the one or more virtually erased portions of the zone (block 760). Instead of writing the overwrite data to the virtually erased portions of the zone, the process 700 can store the overwrite data within the paired memory blocks in a chronologically received order (block 770). In this way, overwrite data that would otherwise be later in an LBA order of zone can be placed before other data with an earlier LBA order if it was received prior to the earlier LBA order data. Once the overwrite data has been stored within the paired memory block, the firmware operated by the controller can update the control table to reflect the location of the overwrite data within the zone (block 780). As discussed above, it is contemplated that various embodiments may have a control table not directly operated by the firmware of the controller per se, but may be operated by a specialized logic that can be housed within the storage device, memory device blocks, or elsewhere.

In some embodiments, there may be a point that the data within the zone is no longer needed, or should be moved to a different sized zone. In these instances, the storage device may receive a zone reset command (block 790). The zone reset command may be sent from the host computing device, or it may be generated internally within the storage device to achieve various goals such as house-keeping related tasks. When the zone reset command is received, the zone can be directed (by the firmware for example) to erase all data within both the zone and the paired memory blocks (block 795). In this way, the zone and the paired memory block are now ready for a repeat of the process and more importantly, have only been subject to one erase command for the entire process. In this way, it is possible to decrease the need to generate an internal zone reset (due to the decreased fragmentation of the zone) and thus increase the overall useable lifetime of the memory devices within the zone.

Figure 8:
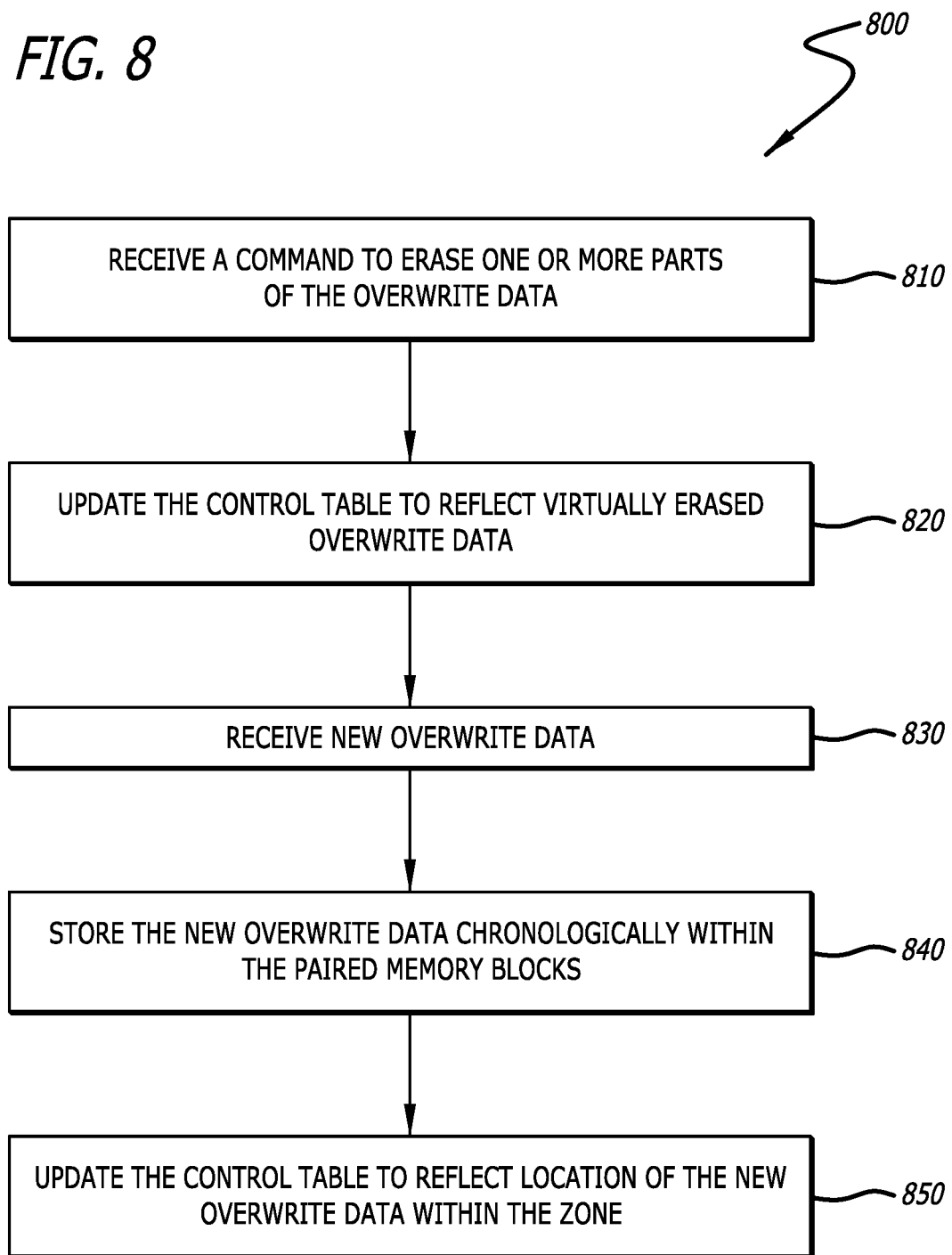
FIG. 8 is a flowchart depicting a process for erasing and updating overwrite data within a paired overwrite block in accordance with an embodiment of the invention.

Referring to FIG. 8, a flowchart depicting a process for erasing and updating overwrite data within a paired overwrite block in accordance with an embodiment of the invention is shown. Similar to the process visually depicted in FIGS. 6A-6B, the flowchart of FIG. 8 discloses how the overwrite management system can handle subsequent overwriting of the original overwrite data. The process 800 can begin once a zone (such as the zone described above with reference to FIG. 7) has been written to with data and subsequently received overwrite data which is stored within a paired memory block(s). The host computing device can send a command to erase one or more parts of the overwrite data, which can be received by the storage device (block 810).

In many embodiments, the firmware operated by the controller can issue an update to the control table to reflect that the affected overwrite data within the paired memory block is now virtually erased overwrite data (block 820). Similar to the data within the zone, the actually memory devices within the paired memory block are not changed or affected by this step. Instead, the internal processing of the firmware has rendered any future call for that location of data to return an invalid response. The paired memory block is now ready to receive new overwrite data associated with the corresponding memory devices within the zone.

Eventually, new overwrite data can be received by the storage device from the host computing device (block 830). Once received, the process 800 can direct the new overwrite data to be stored within the paired memory block in chronologically received order (block 840). As discussed above with reference to FIG. 6C, the newly received overwrite data will not be stored within the previously virtually erased overwrite data, but will be added to the paired memory block adjacently after the previously received overwrite data. In this way, various embodiments will store all received overwrite data in chronological order no matter is part of the data is subsequently called to be erased. Finally, the control table can be updated to reflect the location of the new overwrite data within the zone (block 850). This can be done by pointing any requests for access to the new overwrite data within the overwritten spot of the zone to the paired memory block at the last chronological location it was stored within.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
   a plurality of memory devices, wherein a one or more of the memory devices are designated as overwrite memory devices; and
   a controller configured to direct the storage device to:
   generate one or more subsets of the plurality of memory devices;
   pair each of the one or more subsets of memory devices with at least one or more overwrite memory devices;
   store data sequentially within the subset of memory devices;
   store overwrite data in the overwrite memory devices in chronological order, wherein one or more overprovisioned memory devices are utilized to provide the overwrite memory devices;
   wherein the storage device is further configured to receive a signal from a communicatively connected host computing device; and
   wherein the signal is formatted to indicate whether pairing between the subset of memory devices and the at least one or more overwrite memory devices is required.

2. The storage device of claim 1, wherein the overwrite data is associated with one or more corresponding virtually erased memory devices within the subset of memory devices.

3. The storage device of claim 2, wherein the association between the overwrite data and corresponding virtually erased memory devices is facilitated by a control table.

4. The storage device of claim 3, wherein the control table is managed by a firmware operating within the storage device.

5. The storage device of claim 3, wherein the control table is utilized to redirect requests for data within the virtually erased memory devices to the associated overwrite data within the overwrite memory devices.

6. The storage device of claim 2, wherein the erased memory devices do not share adjacent logical block addresses.

7. The storage device of claim 6, wherein the chronological order of the overwrite data associated with the erased memory devices is not in a sequential logical block address order.

8. The storage device of claim 1, wherein the subset of memory devices and overwrite memory devices are not erased until a reset command is issued.

9. The storage device of claim 8, wherein the reset command erases all memory devices within the subset of memory devices and the paired overwrite memory devices.

10. The storage device of claim 1, wherein the storage device is further configured to analyze the read and write commands received and determine whether pairing between the subset of memory devices and the at least one or more overwrite memory devices is required.

11. The storage device of claim 1, wherein the subset of memory devices is a superblock of memory devices.

12. The storage device of claim 1, wherein the overwrite memory devices is a block of memory devices.

13. The storage devices of claim 1, wherein there is one block of overwrite memory devices for every subset of ninety-six memory devices.

14. A method of managing overwrite data within a storage device comprising:
   generating one or more subsets of memory devices within the storage device;
   pairing each of the one or more subsets of memory devices with at least one or more overwrite memory devices;
   storing data sequentially within the subset of memory devices; and
   storing overwrite data in the overwrite memory devices in chronological order, wherein one or more overprovisioned memory devices are utilized to provide the overwrite memory devices;

wherein the storage device is further configured to receive a signal from a communicatively connected host computing device; and wherein the signal is formatted to indicate whether pairing between the subset of memory devices and the at least one or more overwrite memory devices is required.

15. The method of claim 14, the method further comprising:

receiving subsequent overwrite data wherein the at least part of the subsequent overwrite data directs overwriting of a portion of the previous overwrite data within the overwrite memory devices;

chronologically adding the subsequent overwrite data to the overwrite memory devices; and virtually erasing the overwritten portion of the previous overwrite data within the overwrite memory devices.

16. A storage device, comprising:

a firmware configured to receive commands from a communicatively coupled host computing device;

a plurality of memory devices, wherein a one or more of the memory devices are designated as overwrite memory devices; and a controller configured to receive commands from a communicatively coupled host computing device and direct the storage device to:

parse a received command to generate one or more zones within the memory devices;

generate one or more zones within the plurality of memory devices;

pair each of the one or more zones with at least one or more overwrite blocks of memory devices;

store data sequentially within the one or more zones;

parse a received command to erase one or more memory devices within the zone;

virtually erase the one or more memory devices within the zone;

receive overwrite data directed to the one or more virtually erased memory devices; and store the overwrite data in the overwrite blocks in chronologically received order, wherein one or more overprovisioned memory devices are utilized to provide the overwrite memory devices;

wherein the storage device is further configured to receive a signal from a communicatively connected host computing device; and wherein the signal is formatted to indicate whether pairing between the subset of memory devices and the at least one or more overwrite memory devices is required.

* * * * *